(12) United States Patent
Muthuswamy et al.

(10) Patent No.: US 11,907,269 B2
(45) Date of Patent: Feb. 20, 2024

(54) DETECTING NON-OBVIOUS RELATIONSHIPS BETWEEN ENTITIES FROM VISUAL DATA SOURCES

(71) Applicant: International Business Machines Corporation, Armonk, NY (US)

(72) Inventors: Srinivasan S. Muthuswamy, Ibblur (IN); Mukesh Kumar, Bangalore (IN); Subhendu Das, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/107,991

(22) Filed: Dec. 1, 2020

(65) Prior Publication Data

US 2022/0171795 A1    Jun. 2, 2022

(51) Int. Cl.
*G06F 16/9535* (2019.01)
*G06F 16/951* (2019.01)
*G06F 16/28* (2019.01)
*G06F 16/9536* (2019.01)
*G06F 16/2457* (2019.01)
*G06F 16/587* (2019.01)
*G06F 16/583* (2019.01)

(52) U.S. Cl.
CPC ...... *G06F 16/288* (2019.01); *G06F 16/24578* (2019.01); *G06F 16/587* (2019.01); *G06F 16/5854* (2019.01); *G06F 16/9536* (2019.01)

(58) Field of Classification Search
CPC ............. G06F 16/288; G06F 16/24578; G06F 16/5854; G06F 16/587; G06F 16/9536
See application file for complete search history.

(56) References Cited

U.S. PATENT DOCUMENTS 8,321,358 B2   11/2012   Yeh et al.
9,524,335 B2   12/2016   Kanungo et al.
9,928,447 B2    3/2018   Koren et al.
(Continued)

FOREIGN PATENT DOCUMENTS

CN      110413829 A     11/2019
WO    2020003306 A1      1/2020

OTHER PUBLICATIONS

"Method and System of Using Photographs to Connect Users on Social Networking Sites", An IP.com Prior Art Database Technical Disclosure, IP.com No. IPCOM000212575D, IP.com Electronic Publication Date: Nov. 15, 2011, 3 pages, <https://priorart.ip.com/IPCOM/000212575, accessed Jun. 18, 2020 at 1:15 PM EST>.

*Primary Examiner* — Etienne P Leroux
*Assistant Examiner* — Oscar Wehovz
(74) *Attorney, Agent, or Firm* — Gilbert Harmon, Jr.; Sonny Z. Zhan

(57) ABSTRACT

In an approach for detecting non-obvious relationships between entities from visual data sources, a processor calculates a co-occurrence frequency score for an entity pair from visual data. A processor calculates a distance proximity score for the entity pair from the visual data. A processor determines an event type in the visual data. A processor determines a timeline relationship in the visual data. A processor calculates a relationship score based on the co-occurrence frequency score, the distance proximity score, the event type, and the timeline relationship. A processor detects a relationship between the entity pair based on the relationship score.

20 Claims, 5 Drawing Sheets

(56) References Cited

U.S. PATENT DOCUMENTS

| | | | | |
|---|---|---|---|---|
| 2011/0150278 | A1* | 6/2011 | Shimizu | G06V 10/768 |
| | | | | 382/103 |
| 2015/0242689 | A1* | 8/2015 | Mau | G06F 16/583 |
| | | | | 382/190 |
| 2016/0055409 | A1* | 2/2016 | Majumdar | G06N 3/042 |
| | | | | 706/20 |
| 2016/0125270 | A1* | 5/2016 | Gokturk | G06V 40/107 |
| | | | | 382/118 |
| 2018/0308026 | A1* | 10/2018 | Sinha | G06Q 10/0635 |
| 2020/0084169 | A1* | 3/2020 | Garcia | H04L 67/52 |
| 2021/0034657 | A1* | 2/2021 | Kale | G06V 20/35 |

* cited by examiner

DETECTING NON-OBVIOUS RELATIONSHIPS BETWEEN ENTITIES FROM VISUAL DATA SOURCES

BACKGROUND

The present disclosure relates generally to the field of data analysis, and more particularly to detecting non-obvious relationships between entities from visual data sources.

Data analysis is a process of inspecting, cleansing, transforming and modeling data with the goal of discovering useful information, informing conclusions and supporting decision-making. Data analysis has multiple facets and approaches, encompassing diverse techniques under a variety of names, and may be used in different business, science, and social science domains. Social media are interactive computer-mediated technologies that facilitate the creation or sharing of information, ideas, career interests, and other forms of expression via virtual communities and networks. Many visual data, e.g., images and videos, may be publicly available from social media and internet.

SUMMARY

Aspects of an embodiment of the present disclosure disclose an approach for detecting non-obvious relationships between entities from visual data sources. A processor calculates a co-occurrence frequency score for an entity pair from visual data. A processor calculates a distance proximity score for the entity pair from the visual data. A processor determines an event type in the visual data. A processor determines a timeline relationship in the visual data. A processor calculates a relationship score based on the co-occurrence frequency score, the distance proximity score, the event type, and the timeline relationship. A processor detects a relationship between the entity pair based on the relationship score

DETAILED DESCRIPTION

The present disclosure is directed to systems and methods for detecting non-obvious relationships between entities from visual data sources.

Embodiments of the present disclosure recognize that it can be important to understand relationships between entities within data. Relationships describe the way in which two or more entities (e.g., people, places, objects, etc.) are connected. Discovering relationships between entities within data can be beneficial in areas such as fraud detection. As an example, understanding how a given party (e.g., person or company) relates to other parties may provide insights regarding whether or not the party conducted misconduct (e.g., fraud) with the aid of one or more other parties. Persons involved in fraud and criminal activities tend to mask relationship discovery using techniques such as layering and higher degree of separation using smurfing. As such finding non-obvious relationships becomes difficult using traditional approaches using digital and text data like identifiers. Embodiments of the present disclosure recognize a need for uncovering non-obvious relationships based on frequency of co-occurrence and distance proximity in visual data sources.

Embodiments of the present disclosure disclose detecting non-obvious relationships (who knows who) from visual data sources for an entity pair in visual data. Embodiments of the present disclosure disclose calculating a distance proximity score from the visual data. Embodiments of the present disclosure disclose calculating a frequency of co-occurrence score from the visual data. Embodiments of the present disclosure disclose determining an event type in the visual data. Embodiments of the present disclosure disclose determining a temporal co-occurrence density (timeline relationship between the visual data). Embodiments of the present disclosure disclose using the distance proximity, frequency of co-occurrences, event type, and timeline relationship to identify non-obvious relationships between an entity pair. Embodiments of the present disclosure disclose detecting relationships between the parties and aiding in detection the fraud scenarios. Embodiments of the present disclosure disclose that the relationship weight may be established by the frequency (very frequently vs occasionally) and degree of relation.

Figure 1:
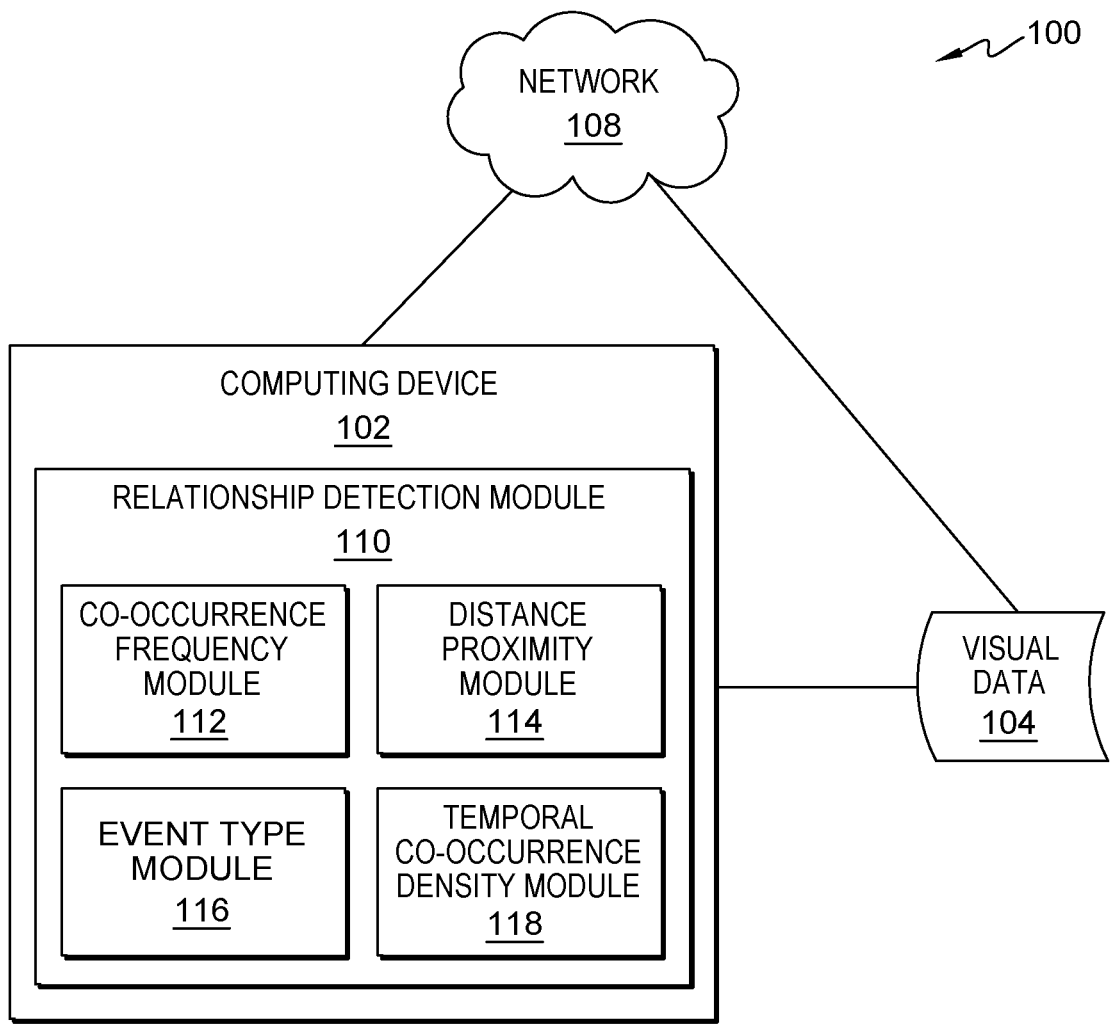
FIG. 1 is a functional block diagram illustrating a relationship detection environment, in accordance with an embodiment of the present disclosure.

The present disclosure will now be described in detail with reference to the Figures. FIG. 1 is a functional block diagram illustrating a relationship detection environment, generally designated 100, in accordance with an embodiment of the present disclosure.

In the depicted embodiment, relationship detection environment 100 includes computing device 102, visual data 104, and network 108. In an example, visual data 104 may be one or more images. In another example, visual data 104 may be one or more videos. In another example, visual data 104 may be a combination of images and videos. Visual data 104 may be in any other suitable visual media. Visual data 104 may include images and or videos publicly available and accessible from a social media. In the depicted embodiment, visual data 104 is located externally. Visual data 104 may be accessed directly by computing device 102. Visual data 104 may be accessed through a communication network such as network 108. In other embodiments, visual data 104 may be located on computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to relationship detection module 110 and network 108 and is capable of processing program instructions and executing relationship detection module 110, in accordance with an embodiment of the present disclosure. Computing device 102 may include internal and external hardware components, as depicted and described in further detail with respect to FIG. 5.

Further, in the depicted embodiment, computing device 102 includes relationship detection module 110. In the depicted embodiment, relationship detection module 110 is located on computing device 102. However, in other embodiments, relationship detection module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and relationship detection module 110, in accordance with a desired embodiment of the disclosure.

In the depicted embodiment, relationship detection module 110 includes co-occurrence frequency module 112, distance proximity module 114, event type module 116, and temporal co-occurrence density module 118. In the depicted embodiment, co-occurrence frequency module 112, distance proximity module 114, event type module 116, and temporal co-occurrence density module 118 are located on computing device 102. However, in other embodiments, co-occurrence frequency module 112, distance proximity module 114, event type module 116, and temporal co-occurrence density module 118 may be located externally and accessed through a communication network such as network 108.

In one or more embodiments, relationship detection module 110 is configured to calculate a co-occurrence frequency score for an entity pair from visual data 104. Relationship detection module 110 may calculate frequency of co-occurrence associated to the entity pair from visual data 104. Relationship detection module 110 may receive visual data 104 associated with the entity pair. In embodiments, receiving visual data 104 associated with the party can include querying one or more visual data sources (e.g., social media, Internet sources, databases, etc.) for visual data 104 that includes the entity pair. In an example, the entity pair may be two individuals. Relationship detection module 110 may count co-occurrence of the entity pair in each image from visual data 104. For example, if the entity pair are in a same image from visual data 104, relationship detection module 110 may count one. If the entity pair are in a same video from visual data 104, relationship detection module 110 may count one. Relationship detection module 110 may sum all the counts together for co-occurrence of the entity pair in visual data 104 into the co-occurrence frequency score.

In one or more embodiments, relationship detection module 110 is configured to calculate a distance proximity score for the entity pair from visual data 104. Relationship detection module 110 may identify a distance proximity for the entity pair. For example, if people are related (e.g., close friends, spouses, siblings, family members), people are more likely to be close to each other in images or videos. When the entity pair are in a same image from visual data 104, relationship detection module 110 may calculate the distance proximity score for the entity pair in the same image based on the distance proximity between the entity pair. If the entity pair is the closer to each other, relationship detection module 110 may calculate the entity pair as the higher distance proximity score. Relationship detection module 110 may determine the distance proximity by detecting the number of entities (e.g., people) between the entity pair in the image. Relationship detection module 110 may calculate the distance proximity score for the entity pair in the same image by one divided by the number of entities between the entity pair in the same image. If the number of entities between the entity pair is zero (i.e., no entity between the entity pair), relationship detection module 110 may define the distance proximity score as a certain score, for example, score two or a score larger than one. If the entity pair are in a same video from visual data 104, relationship detection module 110 may sample the video into images and do the similar distance proximity score calculation for the video as an image for the entity pair. Relationship detection module 110 may sum each distance proximity score for the entity pair in one or more images and or videos from visual data 104 into a total distance proximity score.

In one or more embodiments, relationship detection module 110 is configured to determine an event type in visual data. Relationship detection module 110 may determine an event type in each image or video in visual data 104. Relationship detection module 110 may determine the nature of relation from an event in visual data 104. Relationship detection module 110 may recognize the nature of the event to understand the relationship nature between the entity pair. Relationship detection module 110 may determine the event type in visual data 104 based on event metadata. For example, relationship detection module 110 may determine an event type as a public event based on event metadata indicating the setting or environment in an image in visual data 104 is public. Relationship detection module 110 may recognize a togetherness and occurrence in a small setting event may have a higher score compared to a public event for a relationship between the entity pair in the image in visual data 104. For example, relationship detection module 110 may find the strength of relationship based on the nature of the event. Relationship detection module 110 may find the nature of event to indicate the relationship between the entity pair based on event metadata, for example, information of number of people, and background scene that can be leveraged to find the strength of relationship.

In one or more embodiments, relationship detection module 110 is configured to determine a timeline relationship in visual data 104. Relationship detection module 110 may determine a temporal co-occurrence density of the entity pair in visual data 104. The temporal co-occurrence density may have a positive effect on a relationship score between the entity pair. Relationship detection module 110 may determine relation from the timeline in images in visual data 104. For example, relationship detection module 110 may determine the entity pair known for long, known from past, and or recently known. Relationship detection module 110 may establish the timeline of the events to understand the temporal nature of the relationship between the entity pair. Relationship detection module 110 may determine the timeline relationship (e.g., a co-occurrence timeline) between the entity pair (e.g., the party and the counter party). For example, relationship detection module 110 may determine the initial point in time of co-occurrence, frequency of co-occurrence over time, time gaps in which co-occurrence does not occur, and the most recent point in time of co-occurrence. Relationship detection module 110 may use co-occurrence timings to enhance the relationship score calculation, as the recency, length, and frequency of co-occurrence over time all impact the strength of a relationship between two given parties.

In one or more embodiments, relationship detection module 110 is configured to calculate a relationship score based on the co-occurrence frequency score, the distance proximity score, the event type, and the timeline relationship. Relationship detection module 110 may sum the co-occurrence frequency score and the distance proximity score in consideration of the event type and the timeline relationship. Relationship detection module 110 may analyze factors (e.g., the event type and the timeline relationship) that may impact the relationship score (e.g., between the entity pair). In an example, a small setting event may be a higher score factor compared to a public event. The timeline relationship may be related to the relationship score. A higher relationship score indicates a closer relationship between the entity pair. For example, relationship detection module 110 may determine the relationship timeline between the entity pair (a party and a counter party) by analyzing visual data 104. Relationship detection module 110 may determine the periods of time in which the party and the counter party have been related. For example, relationship detection module 110 may analyze the time of initial co-occurrence, the length of co-occurrence, time gaps in which co-occurrence does not occur, recency of co-occurrence. In some embodiments, the relationship score can represent risk between a party and a counter party. For example, the magnitude of the relationship score can represent risk that a party and counter party may be involved in misconduct such as fraud. As an example, if a given party, Party A, and a counter party, Party B, are involved in an insurance claim, relationship detection module 110 may analyze visual data 104 associated with Party A and Party B. Though the relationship between Party A and Party B may not be obvious, upon analyzation of visual data 104, relationship detection module 110 may identify that Party A and Party B are indeed related. For example, based on analysis of visual data 104, relationship detection module 110 may determine that Party A and Party B have co-occurred in the past, the reasons for co-occurrence relate to misconduct, and further that Party A and Party B may be involved in a network of related entities. Thus, relationship detection module 110 may calculate the relationship score based on the co-occurrence frequency score, the distance proximity score, the event type, and the timeline relationship. Relationship detection module 110 may evaluate a risk that the parties are involved in an insurance claim fraud. In these embodiments, the weighting of factors may be adjusted to more closely represent risk associated with the parties. For example, reasons for co-occurrence may be weighted relatively higher than other relationship score factors.

In one or more embodiments, relationship detection module 110 is configured to detect a relationship between the entity pair based on the relationship score. A higher relationship score indicates a closer relationship between the entity pair. Relationship detection module 110 may identify a non-obvious relationship between the entity pair based on the co-occurrence frequency score, the distance proximity score, the event type, and the timeline relationship. For example, relationship detection module 110 may apply the detected relationship information on a banking transactional network to connect dots among entities (e.g., parties). For example, from a transaction, entity A and entity B are connected, and entity A and entity C are also connected. In an example, when relationship detection module 110 can establish entity B and entity C are connected via images, e.g., in visual data 104, the transaction network can have representations like A-B, B-C (via relation established from visual data 104) and C-A. Relationship detection module 110 can also determine from visual data 104 the nature of relation between A and B, B and C from visual data 104. In an example, relationship detection module 110 may apply the detected relationship among A, B, and C in the transaction network to discover suspicious pattern. For example, information known from transactions includes (i) A sends money to B, and (ii) A receives from C. For the purpose of illustration, relationship detection module 110 may detect relationship information from visual data 104. For example, A and B are colleagues, known from past. B and C are in a same family. Relationship detection module 110 may recognize (i) A sends money to colleague known from past B, (ii) B and C are in a same family; (iii) A receives money from B's family member, i.e., C. Accordingly, relationship detection module 110 may detect a suspicious connection as the money flow is circular (e.g., A to B to C to A).

In one or more embodiments, co-occurrence frequency module 112 is configured to calculate a co-occurrence frequency score for an entity pair from visual data 104. Co-occurrence frequency module 112 may calculate frequency of co-occurrence associated to the entity pair from visual data 104. Co-occurrence frequency module 112 may receive visual data 104 associated with the entity pair. In embodiments, receiving visual data 104 associated with the party can include querying one or more visual data sources (e.g., social media, Internet sources, databases, etc.) for visual data 104 that includes the entity pair. In an example, the entity pair may be two identified individuals. Co-occurrence frequency module 112 may count co-occurrence of the entity pair in each image from visual data 104. For example, if the entity pair are in a same image from visual data 104, co-occurrence frequency module 112 may count one. If the entity pair are in a same video from visual data 104, co-occurrence frequency module 112 may count one. Co-occurrence frequency module 112 may sum all the counts together for co-occurrence of the entity pair in visual data 104 into the co-occurrence frequency score.

In one or more embodiments, distance proximity module 114 is configured to calculate a distance proximity score for the entity pair from visual data 104. Distance proximity module 114 may identify a distance proximity for the entity pair. For example, if people are related (e.g., close friends, spouses, siblings, family members), people are more likely to be close to each other in images or videos. When the entity pair are in a same image from visual data 104, distance proximity module 114 may calculate the distance proximity score for the entity pair in the same image based on the distance proximity between the entity pair. If the entity pair is the closer to each other, relationship detection module 110 may calculate the entity pair as the higher distance proximity score. Distance proximity module 114 may determine the distance proximity by detecting the number of entities (e.g., people) between the entity pair in the image. Distance proximity module 114 may calculate the distance proximity score for the entity pair in the same image by one divided by the number of entities between the entity pair in the same image. If the number of entities between the entity pair is zero (i.e., no entity between the entity pair), relationship detection module 110 may define the distance proximity score as a certain score, for example, score two or a score larger than one. If the entity pair are in a same video from visual data 104, distance proximity module 114 may sample the video into images and do the similar distance proximity score calculation for the video as an image for the entity pair.

Distance proximity module 114 may sum each distance proximity score for the entity pair in one or more images and or videos from visual data 104 into a total distance proximity score.

In one or more embodiments, event type module 116 is configured to determine an event type in visual data. Event type module 116 may determine an event type in each image or video in visual data 104. Event type module 116 may determine the nature of relation from an event in visual data 104. Event type module 116 may recognize the nature of the event to understand the relationship nature between the entity pair. Event type module 116 may determine the event type in visual data 104 based on event metadata. For example, event type module 116 may determine an event type as a public event based on event metadata indicating the setting or environment in an image in visual data 104 is public. Event type module 116 may recognize a togetherness and occurrence in a small setting event may have a higher score compared to a public event for a relationship between the entity pair in the image in visual data 104. For example, event type module 116 may find the strength of relationship based on the nature of the event. Relationship detection module 110 may find the nature of event to indicate the relationship between the entity pair based on event metadata, for example, information of number of people, and background scene that can be leveraged to find the strength of relationship.

In one or more embodiments, temporal co-occurrence density module 118 is configured to determine a timeline relationship in visual data 104. temporal co-occurrence density module 118 may determine a temporal co-occurrence density of the entity pair in visual data 104. The temporal co-occurrence density may have a positive effect on a relationship score between the entity pair. Temporal co-occurrence density module 118 may determine relation from the timeline in images in visual data 104. For example, temporal co-occurrence density module 118 may determine the entity pair known for long, known from past, and or recently known. Temporal co-occurrence density module 118 may establish the timeline of the events to understand the temporal nature of the relationship between the entity pair. Temporal co-occurrence density module 118 may determine the timeline relationship (e.g., a co-occurrence timeline) between the entity pair (e.g., the party and the counter party). For example, temporal co-occurrence density module 118 may determine the initial point in time of co-occurrence, frequency of co-occurrence over time, time gaps in which co-occurrence does not occur, and the most recent point in time of co-occurrence. Temporal co-occurrence density module 118 may use co-occurrence timings to enhance the relationship score calculation, as the recency, length, and frequency of co-occurrence over time all impact the strength of a relationship between two given parties.

Figure 2:
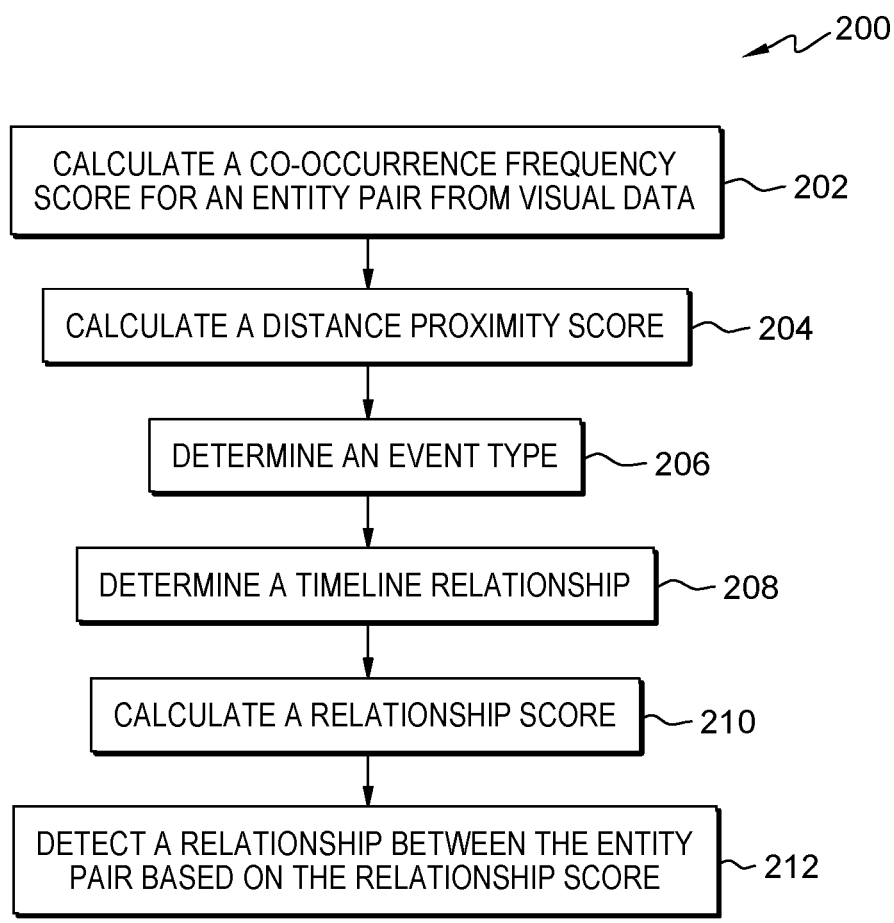
FIG. 2 is a flowchart depicting operational steps of a relationship detection module within a computing device of FIG. 1, in accordance with an embodiment of the present disclosure.

FIG. 2 is a flowchart 200 depicting operational steps of relationship detection module 110 in accordance with an embodiment of the present disclosure.

Relationship detection module 110 operates to calculate a co-occurrence frequency score for an entity pair from visual data 104. Relationship detection module 110 operates to calculate a distance proximity score for the entity pair from visual data 104. Relationship detection module 110 operates to determine an event type in visual data. Relationship detection module 110 operates to determine a timeline relationship in visual data 104. Relationship detection module 110 operates to calculate a relationship score based on the co-occurrence frequency score, the distance proximity score, the event type, and the timeline relationship. Relationship detection module 110 operates to detect a relationship between the entity pair based on the relationship score.

In step 202, relationship detection module 110 calculates a co-occurrence frequency score for an entity pair from visual data 104. Relationship detection module 110 may calculate frequency of co-occurrence associated to the entity pair from visual data 104. In an example, the entity pair may be pre-tagged in a public available data source. Relationship detection module 110 may receive visual data 104 associated with the entity pair. In embodiments, receiving visual data 104 associated with the party can include querying one or more visual data sources (e.g., social media, Internet sources, databases, etc.) for visual data 104 that includes the entity pair. In an example, the entity pair may be two identified individuals. Relationship detection module 110 may count co-occurrence of the entity pair in each image from visual data 104. For example, if the entity pair are in a same image from visual data 104, relationship detection module 110 may count one. If the entity pair are in a same video from visual data 104, relationship detection module 110 may count one. Relationship detection module 110 may sum all the counts together for co-occurrence of the entity pair in visual data 104 into the co-occurrence frequency score.

In step 204, relationship detection module 110 calculates a distance proximity score for the entity pair from visual data 104. Relationship detection module 110 may identify a distance proximity for the entity pair. For example, if people are related (e.g., close friends, spouses, siblings, family members), people are more likely to be close to each other in images or videos. When the entity pair are in a same image from visual data 104, relationship detection module 110 may calculate the distance proximity score for the entity pair in the same image based on the distance proximity between the entity pair. If the entity pair is the closer to each other, relationship detection module 110 may calculate the entity pair as the higher distance proximity score. Relationship detection module 110 may determine the distance proximity by detecting the number of entities (e.g., people) between the entity pair in the image. Relationship detection module 110 may calculate the distance proximity score for the entity pair in the same image by one divided by the number of entities between the entity pair in the same image. If the number of entities between the entity pair is zero (i.e., no entity between the entity pair), relationship detection module 110 may define the distance proximity score as a certain score, for example, score two or a score larger than one. If the entity pair are in a same video from visual data 104, relationship detection module 110 may sample the video into images and do the similar distance proximity score calculation for the video as an image for the entity pair. Relationship detection module 110 may sum each distance proximity score for the entity pair in one or more images and or videos from visual data 104 into a total distance proximity score.

In step 206, relationship detection module 110 determines an event type in visual data. Relationship detection module 110 may determine an event type in each image or video in visual data 104. Relationship detection module 110 may determine the nature of relation from an event in visual data 104. Relationship detection module 110 may recognize the nature of the event to understand the relationship nature between the entity pair. Relationship detection module 110 may determine the event type in visual data 104 based on event metadata. For example, relationship detection module 110 may determine an event type as a public event based on event metadata indicating the setting or environment in an image in visual data 104 is public. Relationship detection module 110 may recognize a togetherness and occurrence in a small setting event has a higher score compared to a public event for a relationship between the entity pair in the image in visual data 104. For example, relationship detection module 110 may find the strength of relationship based on the nature of the event. Relationship detection module 110 may find the nature of event to indicate the relationship between the entity pair based on event metadata, for example, information of number of people, and background scene that can be leveraged to find the strength of relationship.

In step 208, relationship detection module 110 determines a timeline relationship in visual data 104. Relationship detection module 110 may determine a temporal co-occurrence density of the entity pair in visual data 104. The temporal co-occurrence density may have a positive effect on a relationship score between the entity pair. Relationship detection module 110 may determine relation from the timeline in images in visual data 104. For example, relationship detection module 110 may determine the entity pair known for long, known from past, and or recently known. Relationship detection module 110 may establish the timeline of the events to understand the temporal nature of the relationship between the entity pair. Relationship detection module 110 may determine the timeline relationship (e.g., a co-occurrence timeline) between the entity pair (e.g., the party and the counter party). For example, relationship detection module 110 may determine the initial point in time of co-occurrence, frequency of co-occurrence over time, time gaps in which co-occurrence does not occur, and the most recent point in time of co-occurrence. Relationship detection module 110 may use co-occurrence timings to enhance the relationship score calculation, as the recency, length, and frequency of co-occurrence over time all impact the strength of a relationship between two given parties. Relationship detection module 110 may recognize that the relationship weight may be established by the frequency (very frequently vs occasionally) and degree of relation.

In step 210, relationship detection module 110 calculates a relationship score based on the co-occurrence frequency score, the distance proximity score, the event type, and the timeline relationship. Relationship detection module 110 may sum the co-occurrence frequency score and the distance proximity score in consideration of the event type and the timeline relationship. Relationship detection module 110 may analyze factors (e.g., the event type and the timeline relationship) that may impact the relationship score (e.g., between the entity pair). In an example, a small setting event may be a higher score factor compared to a public event. The timeline relationship may be related to the relationship score. A higher relationship score indicates a closer relationship between the entity pair. For example, relationship detection module 110 may determine the relationship timeline between the entity pair (a party and a counter party) by analyzing visual data 104. Relationship detection module 110 may determine the periods of time in which the party and the counter party have been related. For example, relationship detection module 110 may analyze the time of initial co-occurrence, the length of co-occurrence, time gaps in which co-occurrence does not occur, recency of co-occurrence. In some embodiments, the relationship score can represent risk between a party and a counter party. For example, the magnitude of the relationship score can represent risk that a party and counter party may be involved in misconduct such as fraud. As an example, if a given party, Party A, and a counter party, Party B, are involved in an insurance claim, relationship detection module 110 may analyze visual data 104 associated with Party A and Party B. Though the relationship between Party A and Party B may not be obvious, upon analyzation of visual data 104, relationship detection module 110 may identify that Party A and Party B are indeed related. For example, based on analysis of visual data 104, relationship detection module 110 may determine that Party A and Party B have co-occurred in the past, the reasons for co-occurrence relate to misconduct, and further that Party A and Party B may be involved in a network of related entities. Thus, relationship detection module 110 may calculate the relationship score based on the co-occurrence frequency score, the distance proximity score, the event type, and the timeline relationship. Relationship detection module 110 may evaluate a risk that the parties are involved in an insurance claim fraud. In these embodiments, the weighting of factors may be adjusted to more closely represent risk associated with the parties. For example, reasons for co-occurrence may be weighted relatively higher than other relationship score factors.

In step 212, relationship detection module 110 detects a relationship between the entity pair based on the relationship score. A higher relationship score indicates a closer relationship between the entity pair. Relationship detection module 110 may identify a non-obvious relationship between the entity pair based on the co-occurrence frequency score, the distance proximity score, the event type, and the timeline relationship. For example, relationship detection module 110 may apply the detected relationship information on a banking transactional network to connect dots among entities (e.g., parties). For example, from a transaction, entity A and entity B are connected, and entity A and entity C are also connected. In an example, when relationship detection module 110 can establish entity B and entity C are connected via images, e.g., in visual data 104, the transaction network can have representations like A-B, B-C (via relation established from visual data 104) and C-A. Relationship detection module 110 can also determine from visual data 104 the nature of relation between A and B, B and C from visual data 104. In an example, relationship detection module 110 may apply the detected relationship among A, B, and C in the transaction network to discover suspicious pattern. For example, information known from transactions includes (i) A sends money to B, and (ii) A receives from C. For the purpose of illustration, relationship detection module 110 may detect relationship information from visual data 104. For example, A and B are colleagues, known from past. B and C are in a same family. Relationship detection module 110 may recognize (i) A sends money to colleague known from past B, (ii) B and C are in a same family; (iii) A receives money from B's family member, i.e., C. Accordingly, relationship detection module 110 may detect a suspicious connection as the money flow is circular (e.g., A to B to C to A).

FIGS. 3A-3D are example visual data 104 illustrating exemplary functions of relationship detection module 110 in accordance with one or more embodiments of the present disclosure.

In the example of FIGS. 3A-3D, relationship detection module 110 recognizes entity A 302 in first image 308, second image 310, and third image 312 from visual data 104. In an example, relationship detection module 110 may recognize entity A 302 through a tag from a public available source. Relationship detection module 110 recognizes entity B 304 in first image 308. Relationship detection module 110 recognizes entity C 306 in first image 308 and third image 312. Relationship detection module 110 detects both entity A 302 and entity B 304 in first image 308. Relationship detection module 110 calculates frequency score 314 for entity A 302 and entity B 304 (as an entity pair) as 1. Relationship detection module 110 detects both entity A 302 and entity C 306 in first image 308 and third image 312. Relationship detection module 110 calculates frequency score 314 for entity A 302 and entity C 306 (as an entity pair) as 2. Relationship detection module 110 detects both entity B 304 and entity C 306 in first image 308. Relationship detection module 110 calculates frequency score 314 for entity B 302 and entity C 306 (as an entity pair) as 1.

Relationship detection module 110 detects one entity between entity A 302 and entity B 304 in first image 308. Relationship detection module 110 calculates proximity score 316 for entity A 302 and entity B 304 in image 308 as (1/1)=1. Relationship detection module 110 detects two entities between entity B 304 and entity C 306 in first image 308. Relationship detection module 110 calculates proximity score 316 for entity B 304 and entity C 306 in image 308 as (1/2)=0.5. Relationship detection module 110 detects zero entity between entity A 302 and entity C 306 in first image 308. Relationship detection module 110 calculates proximity score 316 for entity A 302 and entity C 306 in image 308 by using an example default score 2 if no entity between the entity pair. As relationship detection module 110 detects neither entity B 304 nor entity C 306 in second image 310, relationship detection module 110 calculates no proximity score 316 for entity A 302 and entity B 304 or for entity A 302 and entity C 306 in image 310. Relationship detection module 110 detects zero entity between entity A 302 and entity C 306 in third image 308. Relationship detection module 110 calculates proximity score 316 for entity A 302 and entity C 306 in third image 312 by using an example default score 2 if no entity between the entity pair. Relationship detection module 110 calculates total proximity score 316 for entity A 302 and entity C 306 for all images (e.g., first image 308, second image 310 and third image 312) by summing each proximity score 316 for entity A 302 and entity C 306 in all images as (2+2)=4. Relationship detection module 110 calculates total proximity score 316 for entity A 302 and entity B 304 for all images (e.g., first image 308, second image 310 and third image 312) by summing each proximity score 316 for entity A 302 and entity B 304 in all images as 1. Relationship detection module 110 calculates total proximity score 316 for entity B 304 and entity C 306 for all images (e.g., first image 308, second image 310 and third image 312) by summing each proximity score 316 for entity B 304 and entity C 306 in all images as 0.5.

Figure 4:
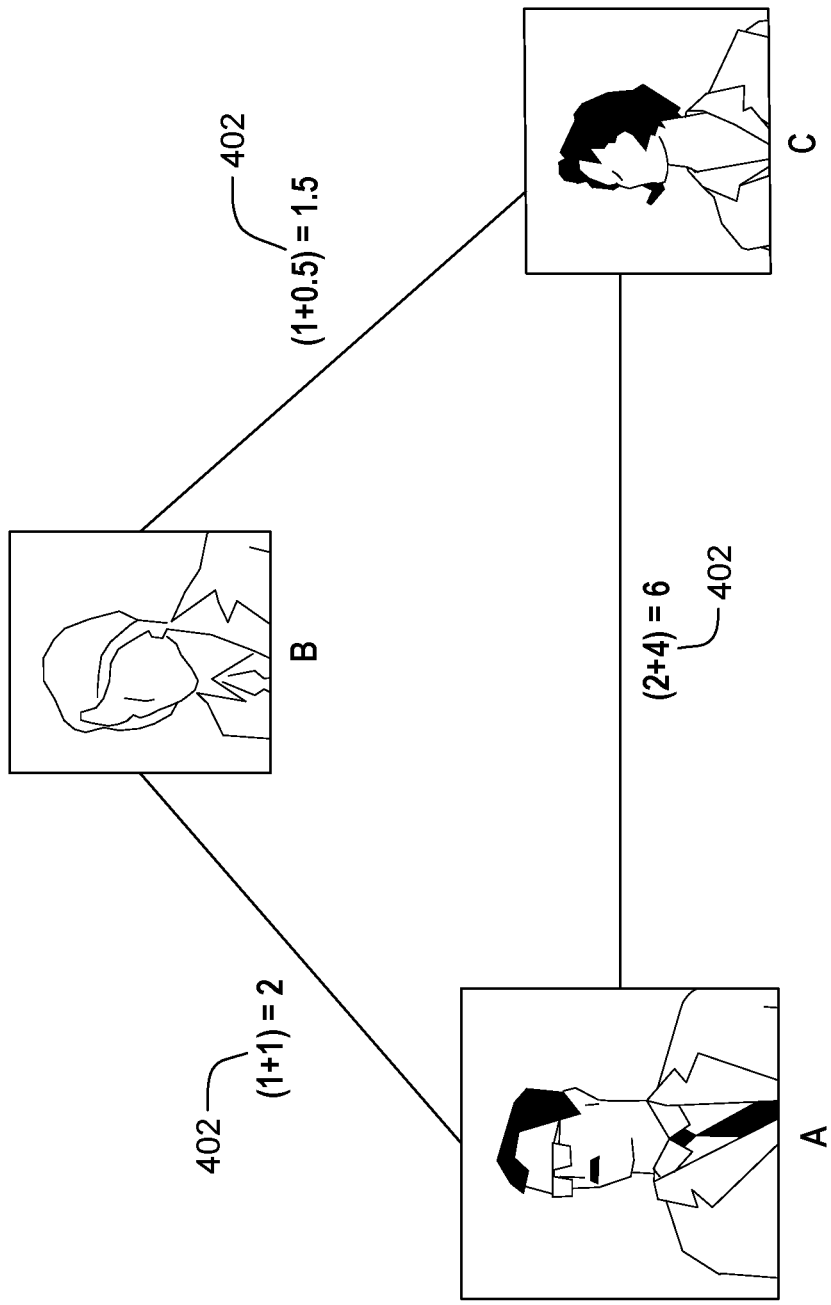
FIG. 4 illustrates exemplary calculation functions of the relationship detection module 110 within the computing device of FIG. 1, in accordance with an embodiment of the present disclosure.

FIG. 4 illustrates exemplary calculation functions of relationship detection module 110 in accordance with one or more embodiments of the present disclosure.

Figure 3B:
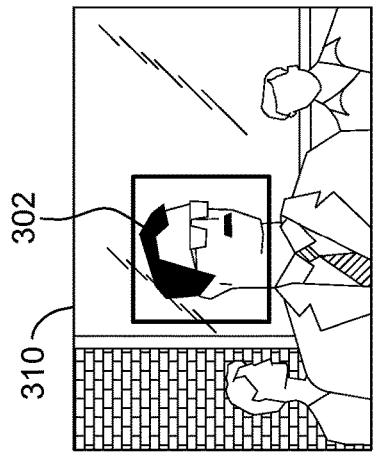
FIGS. 3A-3D are example visual data 104 illustrating exemplary functions of the relationship detection module 110 within the computing device of FIG. 1, in accordance with an embodiment of the present disclosure.
Figure 3D:
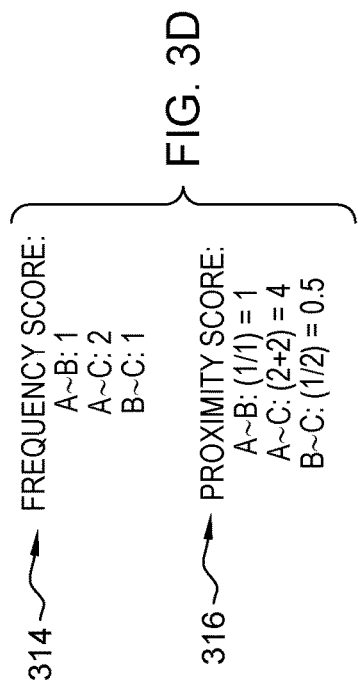
Figure 3A:
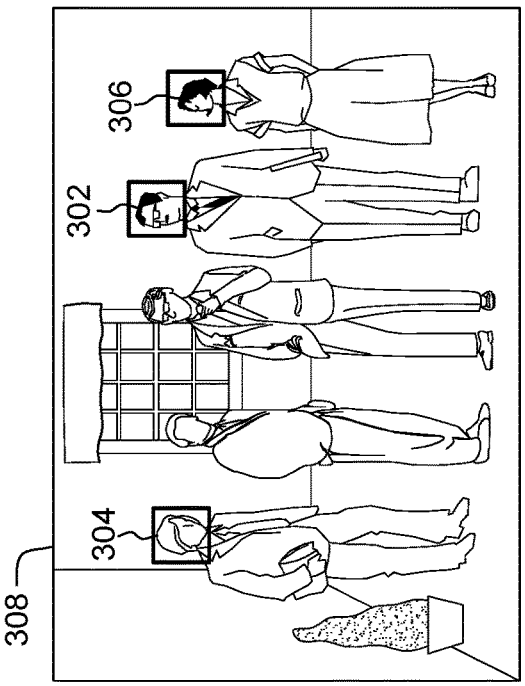
Figure 3C:
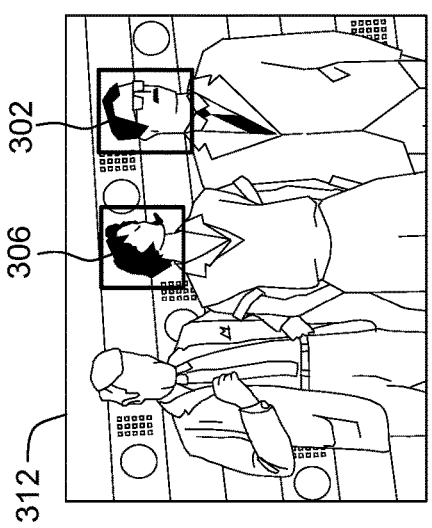

In the example of FIG. 4, relationship detection module 110 adds both frequency score 314 and proximity score 316 into relationship score 402 for each entity pair as demonstrated in FIGS. 3A-3C. For example, relationship detection module 110 may calculate relationship score 402 for entity A 302 and entity C 306 by adding both frequency score 314 and proximity score 316 for the entity pair as the score of (2+4)=6. Relationship detection module 110 may calculate relationship score 402 for entity A 302 and entity B 304 by adding both frequency score 314 and proximity score 316 for the entity pair as the score of (1+1)=2. Relationship detection module 110 may calculate relationship score 402 for entity B 304 and entity C 306 by adding both frequency score 314 and proximity score 316 for the entity pair as the score of (1+0.1)=1.5. Among the example three entity pairs (A~B, A~C, and B~C), relationship detection module 110 detects the entity pair (A~C) has the highest relationship score of 6. Relationship detection module 110 determines the entity pair (A~C) has the closest relationship among the example three entity pairs (A~B, A~C, and B~C) based on relationship score 402 that the entity pair (A~C) has the highest score of 6. A higher relationship score indicates a closer relationship between the entity pair.

Figure 5:
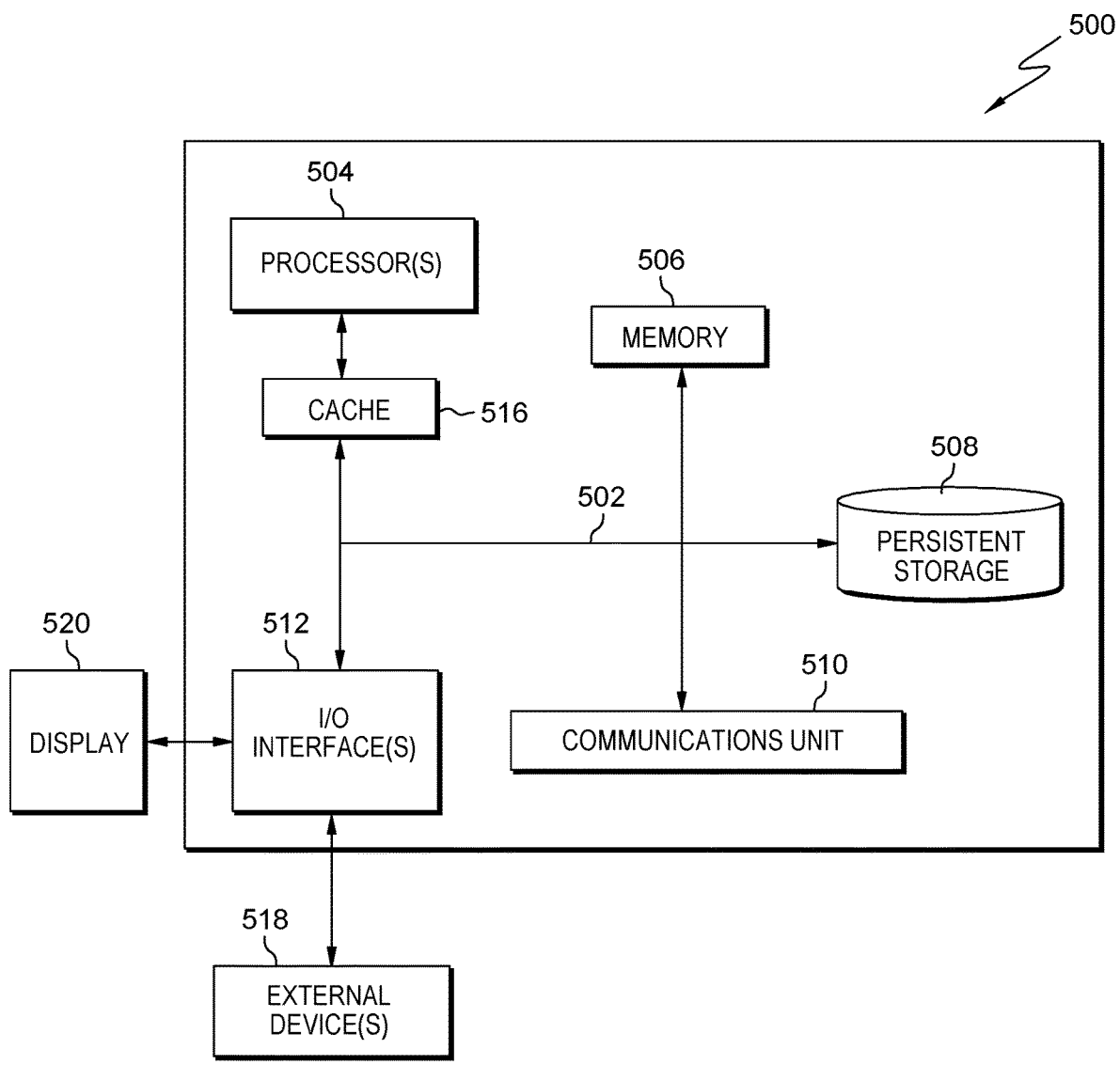
FIG. 5 is a block diagram of components of the computing device of FIG. 1, in accordance with an embodiment of the present disclosure.

FIG. 5 depicts a block diagram 500 of components of computing device 102 in accordance with an illustrative embodiment of the present disclosure. It should be appreciated that FIG. 5 provides only an illustration of one implementation and does not imply any limitations with regard to the environments in which different embodiments may be implemented. Many modifications to the depicted environment may be made.

Computing device 102 may include communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Relationship detection module 110 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Relationship detection module 110 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., relationship detection module 110 can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method incorporated into a risk analysis application, the computer-implemented method comprising:
   calculating, by one or more processors, a co-occurrence frequency score for an entity pair from the visual data;
   calculating, by the one or more processors, a distance proximity score for the entity pair from the visual data;
   determining, by the one or more processors, an event type in the visual data based on event metadata indicating an environment setting including a nature of the event, information of the number of attendees and a background scene;
   determining, by the one or more processors, a timeline relationship in the visual data by determining an initial point of a co-occurrence of the entity pair, a frequency of the co-occurrence over time, a time gap in which the co-occurrence does not occur, and the most recent point of the co-occurrence;
   calculating, by the one or more processors, a relationship score based on the co-occurrence frequency score, the distance proximity score, the event type, and the timeline relationship; and
   adjusting, by the one or more processors, the relationship score, in a risk analysis application, based on changing weighting values of parameters comprising the co-occurrence frequency score, the distance proximity score, the event type and the timeline relationship, after a relationship risk analysis; and
   detecting, by the one or more processors, a relationship between the entity pair based on the relationship score.

2. The computer-implemented method of claim 1, wherein the visual data includes images from a social media.

3. The computer-implemented method of claim 2, wherein calculating the co-occurrence frequency score comprises counting co-occurrence of the entity pair in each image from the visual data.

4. The computer-implemented method of claim 2, wherein calculating the distance proximity score comprises summing each distance proximity score in each image, each distance proximity score calculated as one divided by the number of entities in between the entity pair.

5. The computer-implemented method of claim 1, wherein the event type is a public event.

6. The computer-implemented method of claim 1, wherein calculating the relationship score comprises summing the co-occurrence frequency score and the distance proximity score in consideration of the event type and the timeline relationship, wherein a small setting event has a higher score factor compared to a public event, wherein the timeline relationship is related to the relationship score.

7. The computer-implemented method of claim 1, wherein a higher relationship score indicates a closer relationship between the entity pair.

8. A computer program product incorporated into a risk analysis application, the computer program product comprising:
   one or more computer readable storage media, and program instructions collectively stored on the one or more computer readable storage media, the program instructions comprising:
   program instructions to calculate a co-occurrence frequency score for an entity pair from the visual data;
   program instructions to calculate a distance proximity score for the entity pair from the visual data;
   program instructions to determine an event type in the visual data based on event metadata indicating an environment setting including a nature of the event, information of the number of attendees and a background scene;
   program instructions to determine a timeline relationship in the visual data by determining an initial point of a co-occurrence of the entity pair, a frequency of the co-occurrence over time, a time gap in which the co-occurrence does not occur, and the most recent point of the co-occurrence;
   program instructions to calculate a relationship score based on the co-occurrence frequency score, the distance proximity score, the event type, and the timeline relationship;
   program instructions to adjust the relationship score, in a risk analysis application, based on changing weighting values of parameters comprising the co-occurrence frequency score, the distance proximity score, the event type and the timeline relationship, after a relationship risk analysis; and
   program instructions to detect a relationship between the entity pair based on the relationship score.

9. The computer program product of claim 8, wherein the visual data includes images from a social media.

10. The computer program product of claim 9, wherein program instructions to calculate the co-occurrence frequency score comprise program instructions to count co-occurrence of the entity pair in each image from the visual data.

11. The computer program product of claim 9, wherein program instructions to calculate the distance proximity score comprise program instructions to sum each distance proximity score in each image, each distance proximity score calculated as one divided by the number of entities in between the entity pair.

12. The computer program product of claim 8, wherein the event type is a public event.

13. The computer program product of claim 8, wherein program instructions to calculate the relationship score comprise program instructions to sum the co-occurrence frequency score and the distance proximity score in consideration of the event type and the timeline relationship, wherein a small setting event has a higher score factor compared to a public event, wherein the timeline relationship is related to the relationship score.

14. The computer program product of claim 8, wherein a higher relationship score indicates a closer relationship between the entity pair.

15. A computer system incorporated into a risk analysis application, the computer system comprising:
one or more computer processors, one or more computer readable storage media, and program instructions stored on the one or more computer readable storage media for execution by at least one of the one or more computer processors, the program instructions comprising:
program instructions to calculate a co-occurrence frequency score for an entity pair from the visual data;
program instructions to calculate a distance proximity score for the entity pair from the visual data;
program instructions to determine an event type in the visual data based on event metadata indicating an environment setting including a nature of the event, information of the number of attendees and a background scene;
program instructions to determine a timeline relationship in the visual data by determining an initial point of a co-occurrence of the entity pair, a frequency of the co-occurrence over time, a time gap in which the co-occurrence does not occur, and the most recent point of the co-occurrence;
program instructions to calculate a relationship score based on the co-occurrence frequency score, the distance proximity score, the event type, and the timeline relationship;
program instructions to adjust the relationship score, in a risk analysis application, based on changing weighting values of parameters comprising the co-occurrence frequency score, the distance proximity score, the event type and the timeline relationship, after a relationship risk analysis; and
program instructions to detect a relationship between the entity pair based on the relationship score.

16. The computer system of claim 15, wherein the visual data includes images from a social media.

17. The computer system of claim 16, wherein program instructions to calculate the co-occurrence frequency score comprise program instructions to count co-occurrence of the entity pair in each image from the visual data.

18. The computer system of claim 16, wherein program instructions to calculate the distance proximity score comprise program instructions to sum each distance proximity score in each image, each distance proximity score calculated as one divided by the number of entities in between the entity pair.

19. The computer system of claim 15, wherein program instructions to calculate the relationship score comprise program instructions to sum the co-occurrence frequency score and the distance proximity score in consideration of the event type and the timeline relationship, wherein a small setting event has a higher score factor compared to a public event, wherein the timeline relationship is related to the relationship score.

20. The computer system of claim 15, wherein a higher relationship score indicates a closer relationship between the entity pair.

* * * * *